June 18, 1963
A. K. OSE ETAL
3,094,172
CULTIVATOR FRAME
Filed May 2, 1960
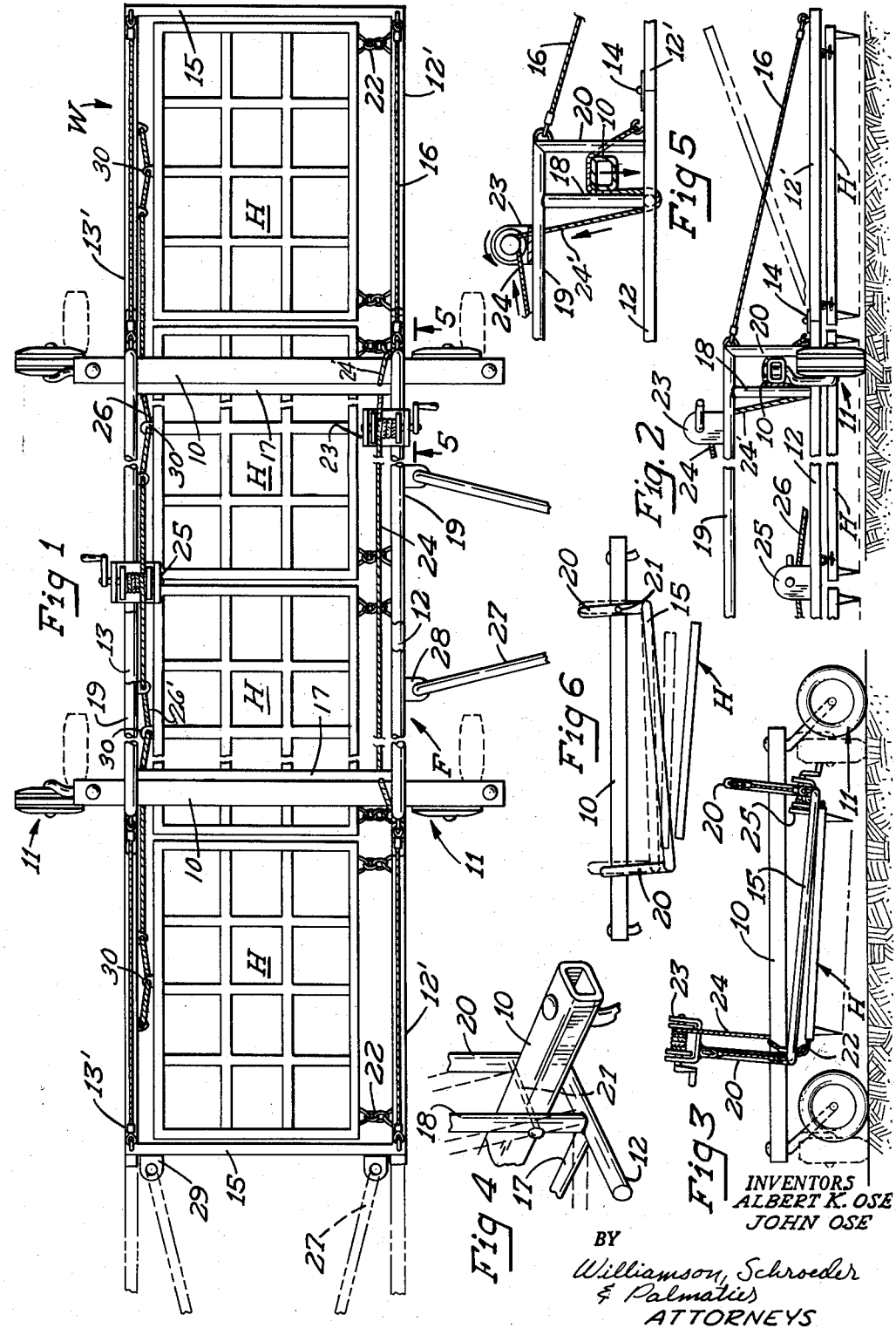
INVENTORS
ALBERT K. OSE
JOHN OSE
BY
Williamson, Schroeder
& Palmatier
ATTORNEYS

United States Patent Office 3,094,172
Patented June 18, 1963

3,094,172
CULTIVATOR FRAME
Albert K. Ose and John Ose, Wood Lake, Minn.
Filed May 2, 1960, Ser. No. 26,182
6 Claims. (Cl. 172—456)

This invention relates to cultivator type agricultural implements and in particular to a novel and unique cultivator frame structure which is especially useful in supporting and transporting harrow sections although its use is not necessarily limited thereto.

Agricultural implements involving gangs of ground working or cultivating tools such as harrow sections which are spread out over a wide area to cultivate as wide a swath as possible and the supporting and transporting structures therefor have long presented many problems because of their size and necessary functional arrangement with respect to one another. Since the harrow sections are usually disposed or mounted in series transversely of the normal direction of travel so as to cultivate as wide a swath as possible, the frames for supporting these harrows must necessarily be very wide, bulky and awkward. Because of this great width and size these frames have been difficult to handle in the past. One of the problems associated with these wide cultivator frames for gangs of ground working tools such as harrow sections is that the normal operational width of the frame is much greater than normal road width as well as gate openings in fences for passing into and out of fields and between fields, thereby presenting serious problems insofar as moving the implement between fields and transporting the same along the highway is concerned. In many instances the structure is so wide that it is virtually impossible for it to be transported safely down the highway at all, or in many instances the width is such that it can be transported down the highway but is not within the legal overall width limits normally allowed so that the operator must obtain a special permit to enable him to transport the implement along the highway.

Another important problem associated with harrow structures has been the raising or lowering of the harrows back and forth between transport and operational ground engaging position since this usually requires lifting of the heavy harrow sections and great individual effort on the part of the operator.

Also, most of the prior art devices do not provide means for selectively varying the depth of the height of the harrow sections and with it the depth of penetration during ground engaging and working operation nor do the prior art devices provide means for selectively varying the angle of the harrow sections with respect to the ground being traversed and worked in order to be able to adjust the harrow sections to the most desirable angle of attack considering the particular ground conditions being encountered.

Therefore, the general objects of this invention relate to the resolution of the foregoing problems and deficiencies of cultivating equipment, including providing a novel cultivator frame which is easy to operate, readily convertible from road to field conditions both as to the width of the unit and the height of the ground working tools, and which provides for readily varying the angle at which the ground working tools, and particularly the teeth of a harrow section are presented to the ground being worked.

A more specific object is a harrow cultivator frame capable of supporting a series of harrow sections in side-by-side relationship, which frame is readily convertible to travel on conventional roads, highways and for passage through fence openings and the like without the necessity of undertaking the usually laborious task of folding up or breaking down the frame and lifting and re-arranging the harrow sections.

Another more specific object is to provide a cultivator frame which, together with the cultivating tools carried thereon may be easily and conveniently raised and lowered between transport and operational elevation.

Still another more specific object is to provide a cultivator frame which is hingedly mounted for tilting or swinging movement about a horizontal axis transverse to the direction of operational ground working movement.

A still further more specific object is to provide a cultivator frame which is hingedly mounted to enable the leading end thereof from which the ground working tools such as harrow sections are suspended to be raised and lowered to enable the harrow sections which are suspended from said frame and adapted for independent swinging up and down movement of the trailing edges thereof to be conveniently moved between transport and operational ground engaging height, to vary the depth of activity and angle of attack of the teeth of said harrow sections.

Still another object is a cultivator frame which, together with the harrow sections suspended therefrom, may be easily and mechanically raised to enable the entire unit to be easily withdrawn from sloughs and the like if it should bog down or become stuck in such soft ground conditions.

Still another object is a pivotally mounted cultivator frame whose leading edge may be swung up and down as desired by the operator, and which has independently hinged outer ends which are free to raise or tilt upwardly if encountering an obstruction or if one side sinks too low with respect to the remainder of the unit to prevent damage to the implement.

Still another object is to provide a cultivator frame which is swingable about a horizontal axis transverse to the direction of operational ground engaging movement and which is adapted for lateral extension by the addition of additional frame portions to support additional harrow sections.

These and other objects and advantages of our invention will more fully appear from the following description made in connection with the accompanying drawings wherein like reference characters refer to the same or similar parts throughout the several views, and in which:

FIG. 1 is a broken top plan view;

FIG. 2 is a partial front elevational view showing one end of the cultivator frame;

FIG. 3 is a side elevational view as viewed from the right side of FIG. 1;

FIG. 4 is a partial perspective detail view on an enlarged scale illustrating the tilting movements of the frame;

FIG. 5 is a partial detail front view on an enlarged scale as viewed on the lines 5—5 of FIG. 1, illustrating the manner of raising and lowering the frame; and FIG. 6 is a diagrammatic side elevational view illustrating a view of the variety of positions and angles which the harrow sections carried by our cultivator frame can assume.

Reference is now made to the accompanying drawings for a more detailed description and better understanding of our invention.

The cultivator frame of our invention includes a mobile main supporting frame or chassis which includes a pair of parallel laterally spaced apart main supporting beams 10 which are disposed in the direction of normal operation or cultivating movement, each of said main beams 10 having mounted thereon adjacent each end thereof a caster wheel 11, which wheels provide mobility for the unit and at the same time enable it to be moved in any direction desired.

The remainder of the structural equipment is pivotally mounted on and carried by this main supporting chassis. The remainder of the unit includes a main harrow supporting frame, indicated generally by F, which is comprised of two main elongate spaced apart frame members 12, and 13. The front or leading frame member 12 and the rear member 13 are each provided with hinged extensions 12' and 13' which are connected to the main frame members 12 and 13 by hinges 14 and which cooperate with the cross-bracing end members 15 to provide hinged extensions or wings W which are free to swing upwardly when encountering any unusual upward force thereon, such as when one side sinks into a hole or furrow, to prevent damage to the structure and enable the cultivating operation to continue without any serious interruption. The end members 15 are detachably connected to the extension members 12' and 13' to permit additional frame sections or extensions to be added to the basic unit shown to increase the number of harrow sections which can be carried and to widen the swath of harrowing action, and to permit the overall size of the entire unit to be selectively adjusted to the power of the particular tractor pulling the unit, and also to enable the complete unit to be adjusted size-wise to meet the particular conditions of the field being cultivated. The front or leading frame member 12 and its lateral extensions 12' serve as the draw bar for the harrow sections H, and the main support therefor. The wing sections W are normally maintained in aligned relationship with the remainder main frame F and prevented from sagging and dragging by means of flexible supporting guy wires 16 which extend between and are connected at opposite ends to the wings W and the cross bridging or super structure of the main supporting frame F hereinafter to be described.

The main frame F is provided with certain super structure or bringing and other additional support to enable it to be pivotally mounted on the main chassis and raised and lowered and provide support for additional elements or units comprising the cultivator frame. This additional structure includes a pair of cross bracing members 17 extending between and rigidly connected to the main frame members 12 and disposed just inwardly of and parallel to the main chassis means 10. A pair of vertical supports 18 extend upwardly from the frame adjacent each end of the cross braces 17 and interconnect the frame with the elongate transversely extending bridging members 19 which are disposed directly above and in alignment with the main frame members 12 and 13 and extend across and beyond the main chassis beams 10 and terminate in vertical end portions or legs 20, the lower ends of which are connected to the main frame members 12 and 13.

The frame F is pivotally mounted on the main supporting chassis by means of pivot or hinge pins 21 which interconnect the main beams 10 and the vertical supports 18 and 20 located on opposite sides of each of the beams 10. Thus, the main harrow supporting frame F and all of the other elements attached thereto are adapted for free pivotal movement about the pivot pins 21 and with respect to the main beams 10 to enable the leading end and harrow draw bar consisting of frame members 12 and 12' of the frame F to be freely raised and lowered as desired. The vertical supports 18 and 20 located forwardly of the frame define a vertical channel therebetween in which the main beam 10 freely moves as the frame is raised or lowered, with the portion of the bridging member 19 located between the vertical supports 18 and 20 and directly above beam 10 providing a stop member to limit the downward movement of the leading edge of the frame and harrow draw bar and prevent further lowering beyond that point.

The leading frame members 12 and their extension members 12' extending laterally therefrom and comprising the harrow draw bar have the conventional harrow sections H flexibly connected thereto and suspended therefrom by means of short chains 22 which extend between and are connected to the leading edges of the harrow sections H and the frame members 12 and 12', thereby providing the harrow sections H with the freedom of movement necessary to properly conduct the harrowing action, including limited free vertical movement as well as swinging movement with respect to the draw bar.

To raise and lower the portion of the frame pivotally suspended or mounted on the main chassis, a cable winch 23 is mounted on the leading bridging member 19. Cables 24 and 24' are wound on the cable drum of the winch 23 and extend therefrom downwardly in opposite directions so as to be coiled or wrapped under each of the cross bracing members 17 and over each of the main beams 10, the outer ends of the cables 24 and 24' being anchored in any suitable fashion to the main frame F. Thus, by turning the cable drum of the winch 23 in one direction the cables 24 and 24' are wound thereon and tensioned, causing the entire frame F to pivot about the pins 21 and swing upwardly and cause the draw bar and harrow sections to be raised, and by reverse turning the cables are unwound and the frame is lowered.

To control the height and angular position of the harrow sections H, a second winch 25 is mounted on the rear of the frame F and on the rear frame member 13 in the form shown in the drawings. This second winch 25 controls and operates cables 26 and 26' which are wound upon the cable drum and which extend from the winch 25 in opposite directions and are interconnected with the trailing ends of each of the harrow sections H such as by being successively threaded through the eye elements 30 carried by each of the sections, the outer ends of the cables 26 and 26' ultimately being anchored to some portion of the frame in any suitable fashion. Thus, by winding or unwinding of the cables by turning of the winch 25 in one direction or the other, the trailing end of the harrow sections may be raised or lowered respectively to any elevation desired.

To pull the unit in the desired direction, a V-shaped draft unit 27 is provided, the rear or free ends of which are down turned or bent and are adapted to be detachably hooked into the openings of the tab-like draft connections 28 provided on the leading edge of the frame member 12 so as to connect the unit with a vehicle such as a tractor capable of pulling such a unit. This connection is obviously for pulling the entire unit during cultivating operation. However, when it is desired to transport the entire unit down a highway or move the same through a relatively narrow opening in a fence, tab-like draft connections 29 similar to 28 are provided on the ends of the frame such as by mounting them on the end cross braces 15 to enable the entire unit to be pulled endwise with the longest portion thereof disposed in the direction of travel instead of widthwise as during actual working operation, thereby substantially reducing the overall width of the implement.

Thus, in operation, it will be appreciated that the draft member 27 will be connected to the draft connections 29 located on one end of the frame to transport the unit back and forth between fields and over highways to the particular field where it is to be employed. After arrival at the field, the draft member 27 is disconnected from the connections 29 and connected to the draft connections 28 to enable the entire unit to be pulled widthwise with the harrow sections in side-by-side relationship rather than in serial fashion one behind the other as in transport position. During the transporting of the unit to the field, where it is to be used, the frame F and the harrow sections H are raised to their approximately maximum elevation as best seen in FIG. 3 by suitably winding up the cables 24 and 24' and 26 and 26' on the drums of their respective winches. To lower the harrow sections into ground engaging working position, the front winch 23 and its cables 24 and 24' are unwound to lower the harrow draw bar or leading end of the main harrow supporting frame and the rear winch 25 is also unwound to lower the trailing end of the harrow sections to whatever height desired. Because of this ability to selectively and independently raise and lower the harrow draw bar and the trailing edges of the harrow sections, the harrow sections may be adjusted to assume an almost infinite variety of angulations and positions depending on the particular conditions of the field to be cultivated. A few of the different positions which the harrow sections H may assume is diagrammatically illustrated in FIG. 6. This ability to vary the angle of attack of the harrow sections with respect to the ground being culivated is very important to the farmer since it enables him to meet and cope with almost every possible situation which might be encountered in the course of cultivating a field with a harrow.

From the foregoing, the advantages of our invention are readily apparent. The foregoing disclosure makes it clear that the entire unit may be pulled either widthwise or endwise for ground engagement cultivating operation or for transportation respectively as desired by simply shifting the draft member from the front draw bar 12 to one end of the unit without requiring any collapsing, folding or breaking down of the main harrow frame and without any disturbance or manual lifting of the harrow sections whatsoever. The frame may be easily raised or lowered with a minimum of effort by means of the winch 23 and its cables 24 and 24' and the harrow sections may be raised or lowered easily by means of the winch 25 and its cables 26 and 26' again with a minimum effort on the part of the operator to raise and lower them between transport and operational position and to also vary the angle of attack. Thus, this unit permits the harrow sections to be transported, raised and lowered and angularly controlled with a minimum amount of effort on the part of the operator, such as is not capable of being duplicated by any of the prior art apparatus presently available to the public.

It will be further appreciated that the hingedly mounted wings provided on the cultivator unit prevent serious damage to the unit if one side or the other is dropped or lowered accidentally so as to come into contact with the ground since the hinged arrangement thereof permits the wings to yield upwardly when encountering any resistance so that if one side drops into a slough or furrow to any considerable extent the harrowing operation may continue without interruption and without damage to the equipment.

Another advantage of our invention is that the dual independent control of the movements of both the harrow supporting frame and the harrows themselves, together with the provision for pulling the unit endwise as well as widthwise, permits accurate control of the movements and positions of the harrows while not requiring movement through extreme limits, such as changing the harrows from horizontal to vertical, as in many of the prior art devices.

It will also be appreciated that the particular manner of mounting the harrow draw bar and the harrow sections on the wheeled supporting structure with the general frame organization disposed between the caster wheels provide a stable structure which is easy to handle and control.

It will, of course, be understood that various changes may be made in the form, details, arrangement and proportions of the various parts without departing from the scope of our invention.

What we claim is:

1. In cultivator structure, a supporting chassis adapted for travel over the ground, elongate tool carrying frame means having a series of harrow sections suspended therefrom by flexible link means interconnecting the leading ends of said sections with said frame for free swinging movement of said sections with respect to said frame, means pivotally mounting said frame on said chassis for swinging movement thereof between raised transport and lowered cultivating position, first winch and cable means cooperatively and operationally interconnecting said frame and said chassis for the raising and lowering of said frame, and second winch and cable means cooperatively interconnected with the trailing ends of said harrow sections and adapted to independently raise and lower said trailing ends of said harrow sections simultaneously to selectively vary the angular relationship between said sections and the ground being cultivated thereby.

2. Cultivating apparatus comprising a pair of parallel laterally spaced apart elongate main supporting chassis members, each of said members having a caster type ground engaging and traversing wheel mounted thereon adjacent each end thereof, elongate tool carrying frame means extending between said members and disposed transversely of said members and the direction of cultivating movement, said frame having a series of harrow sections suspended therefrom for free movements with respect thereto along the length of said frame, means pivotally mounting said frame on said supporting members for swinging vertical movement thereof between raised transport position and lowered cultivating position about an axis parallel to the length of said frame, means for effecting said swinging movement of said frame for maintaining said frame at any selected height above the ground between the extreme of raised and lowered positions, and additional means for independently raising and lowering the trailing end of the harrow sections simultaneously to selectively vary the angular relationship between said sections and the ground being cultivated thereby.

3. The apparatus set forth in claim 2, including draft means for alternately pulling said frame widthwise for cultivating movement and endwise for transportation purposes.

4. The apparatus set forth in claim 2, wherein said frame and harrow sections are located entirely between the longitudinal span of said supporting members and their respective caster wheels to provide a stable over-all structure.

5. In cultivator structure, a supporting chassis adapted for travel over the ground, elongate tool carrying frame means having a series of harrow sections suspended therefrom by flexible link means interconnecting the leading ends of said sections with said frame for free swinging movement of said sections with respect to said frame, means pivotally mounting said frame on said chassis for swinging movement thereof between raised transport and lowered cultivating position, means cooperatively and operationally interconnecting said frame and said chassis for the raising and lowering of said frame, and means cooperatively interconnected with the trailing ends of said harrow sections and adapted to independently raise and lower said trailing ends of said harrow sections simultaneously to selectively vary the angular relationship between said sections and the ground being cultivated thereby.

6. Cultivating apparatus comprising a pair of parallel laterally spaced apart elongate main supporting chassis members adapted for travel over the ground, elongate tool carrying frame means extending between said members and disposed transversely of said members and the direction of cultivating movement, said frame having a series of harrow sections suspended therefrom for free movements with respect thereto along the length of said frame, means pivotally mounting said frame on said supporting members for swinging vertical movement thereof between raised transport position and lowered cultivating position about an axis parallel to the length of said frame, means for effecting said swinging movement of said frame for maintaining said frame at any selected height above the ground between the extreme of raised and lowered positions, and additional means for independently raising and lowering the trailing end of the harrow sections simultaneously to selectively vary the angular relationship between said sections and the ground being cultivated thereby.

References Cited in the file of this patent

UNITED STATES PATENTS

| | | |
|---|---|---|
| 650,273 | Potter et al. | May 22, 1900 |
| 1,154,763 | Gunderson | Sept. 28, 1915 |
| 1,332,049 | Lockhart | Feb. 24, 1920 |
| 2,599,251 | Garrett | June 3, 1952 |
| 2,658,770 | Koenig | Nov. 10, 1953 |
| 2,944,615 | Clark | July 12, 1960 |

FOREIGN PATENTS

| | | |
|---|---|---|
| 1,143,622 | France | Apr. 15, 1952 |